United States Patent
Mills

(10) Patent No.: US 12,327,177 B2
(45) Date of Patent: Jun. 10, 2025

(54) PROCESSING NON-POWER-OF-TWO WORK UNIT IN NEURAL PROCESSOR CIRCUIT

(71) Applicant: Apple Inc., Cupertino, CA (US)

(72) Inventor: Christopher L. Mills, Saratoga, CA (US)

(73) Assignee: APPLE INC., Cupertino, CA (US)

(*) Notice: Subject to any disclaimer, the term of this patent is extended or adjusted under 35 U.S.C. 154(b) by 1066 days.

(21) Appl. No.: 17/148,358

(22) Filed: Jan. 13, 2021

(65) Prior Publication Data

US 2022/0222509 A1    Jul. 14, 2022

(51) Int. Cl.
*G06N 3/063* (2023.01)
*G06F 7/76* (2006.01)
*G06F 7/78* (2006.01)

(52) U.S. Cl.
CPC .......... *G06N 3/063* (2013.01); *G06F 7/764* (2013.01); *G06F 7/78* (2013.01)

(58) Field of Classification Search
CPC .......... G06N 3/063; G06F 7/764; G06F 7/78
See application file for complete search history.

(56) References Cited

U.S. PATENT DOCUMENTS

| | | | |
|---|---|---|---|
| 10,430,706 B2 | 10/2019 | Henry et al. | |
| 10,678,508 B2 | 6/2020 | Vantrease et al. | |
| 11,662,986 B1* | 5/2023 | Catron | G06F 8/41 718/104 |
| 11,704,562 B1* | 7/2023 | Khaitan | G06N 3/063 706/25 |
| 2014/0184268 A1* | 7/2014 | Alfieri | H03K 19/0008 326/46 |
| 2018/0165574 A1* | 6/2018 | Young | G06F 7/5443 |
| 2019/0087713 A1 | 3/2019 | Lamb et al. | |
| 2019/0340214 A1* | 11/2019 | Gudovskiy | G06N 3/04 |
| 2020/0160226 A1* | 5/2020 | Ross | G06F 7/76 |
| 2020/0301994 A1* | 9/2020 | Dikici | G06N 3/063 |
| 2022/0067512 A1* | 3/2022 | Khailany | G06N 3/08 |
| 2022/0114413 A1* | 4/2022 | Qi | G06N 3/04 |
| 2022/0291899 A1* | 9/2022 | Vogel | G06F 7/4833 |

* cited by examiner

*Primary Examiner* — Thu V Huynh
(74) *Attorney, Agent, or Firm* — Sterne, Kessler, Goldstein & Fox P.L.L.C.

(57) ABSTRACT

A neural processor includes one or more neural engine circuits for performing convolution operations on input data corresponding to one or more tasks to generate output data. The neural engine circuits process the input data having a power-of-two (P2) shape. The neural processor circuit also includes a data processor circuit. The data processor circuit fetches source data having a non-power-of-two (NP2) shape. The source data may correspond to data of a machine learning model. The data processor circuit also reshapes the source data to generate reshaped source data with the P2 shape. The data processor circuit further sends the reshaped source data to the one or more neural engine circuits as the input data for performing convolution operations. In some cases, the data processor circuit may also perform padding on the source data before the source data is reshaped to the P2 shape.

20 Claims, 13 Drawing Sheets

PROCESSING NON-POWER-OF-TWO WORK UNIT IN NEURAL PROCESSOR CIRCUIT

BACKGROUND

1. Field of the Disclosure

The present disclosure relates to a circuit for performing operations related to neural networks, and more specifically to operations related to processing work units with non-power-of-two shapes in neural processor circuits.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning techniques that primarily uses convolution between input data and kernel data, which can be decomposed into multiplication and accumulation operations.

Depending on the types of input data and operations to be performed, these machine learning systems or models can be configured differently. Such varying configurations would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configurations is relatively easy because such systems or models can be instantiated with mere updates to code. However, relying solely on the CPU for various operations of these machine learning systems or models would consume significant bandwidth of a central processing unit (CPU) as well as increase the overall power consumption.

Electronic devices may be equipped with a neural processor specialized in performing computations related to machine learning models. As artificial intelligence has become increasingly more common, a wide variety of machine learning algorithms are used in different software applications. Neural processors are specialized in perform certain computations, but sometimes the processors may not be configured to work optimally with different kinds of algorithm.

SUMMARY

Embodiments relate to a neural processor circuit including one or more neural engine circuits for performing convolution operations on input data corresponding to one or more tasks to generate output data. The neural engine circuits process the input data having a power-of-two (P2) shape. The neural processor circuit also includes a data processor circuit. The data processor circuit fetches source data having a non-power-of-two (NP2) shape. The data processor circuit also reshapes the source data to generate reshaped source data with the P2 shape. The data processor circuit further sends the reshaped source data to the one or more neural engine circuits as the input data.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural processor that includes a data processor circuit reshape source data that is in a non-power-of-two (NP2) shape to a work unit with a power-of-two (P2) shape that is associated with an improved performance of a neural engine that is used to perform computations related to machine learning models. Common units in various popular neural networks are often associated with NP2 shapes. The data processor circuit reshapes the source data from a NP2 shape to a P2 shape to increase the utilization rate of the neural processor.

Example Electronic Device

Embodiments of electronic devices, user interfaces for such devices, and associated processes for using such devices are described. In some embodiments, the device is a portable communications device, such as a mobile telephone, that also contains other functions, such as a personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

Figure 1:
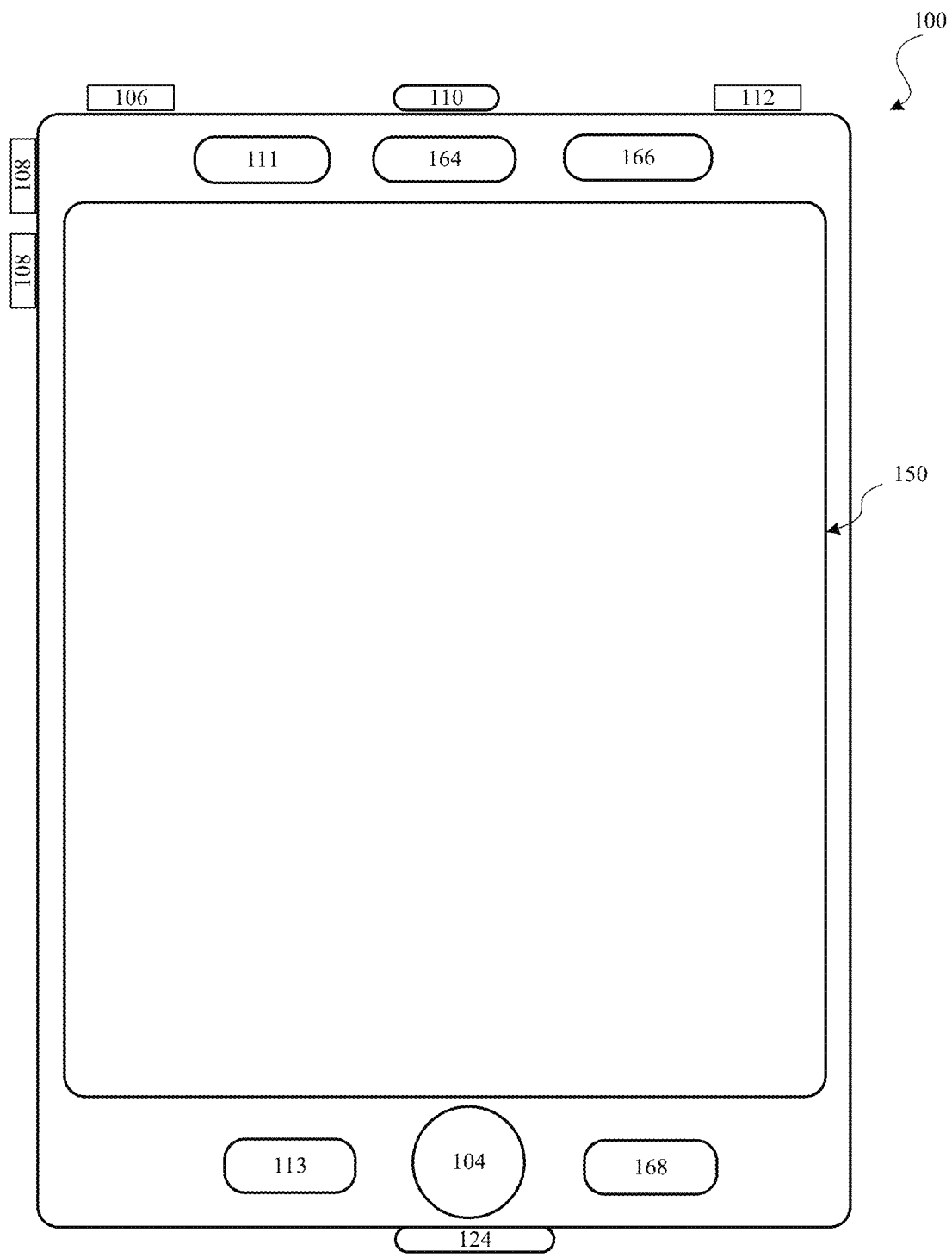
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
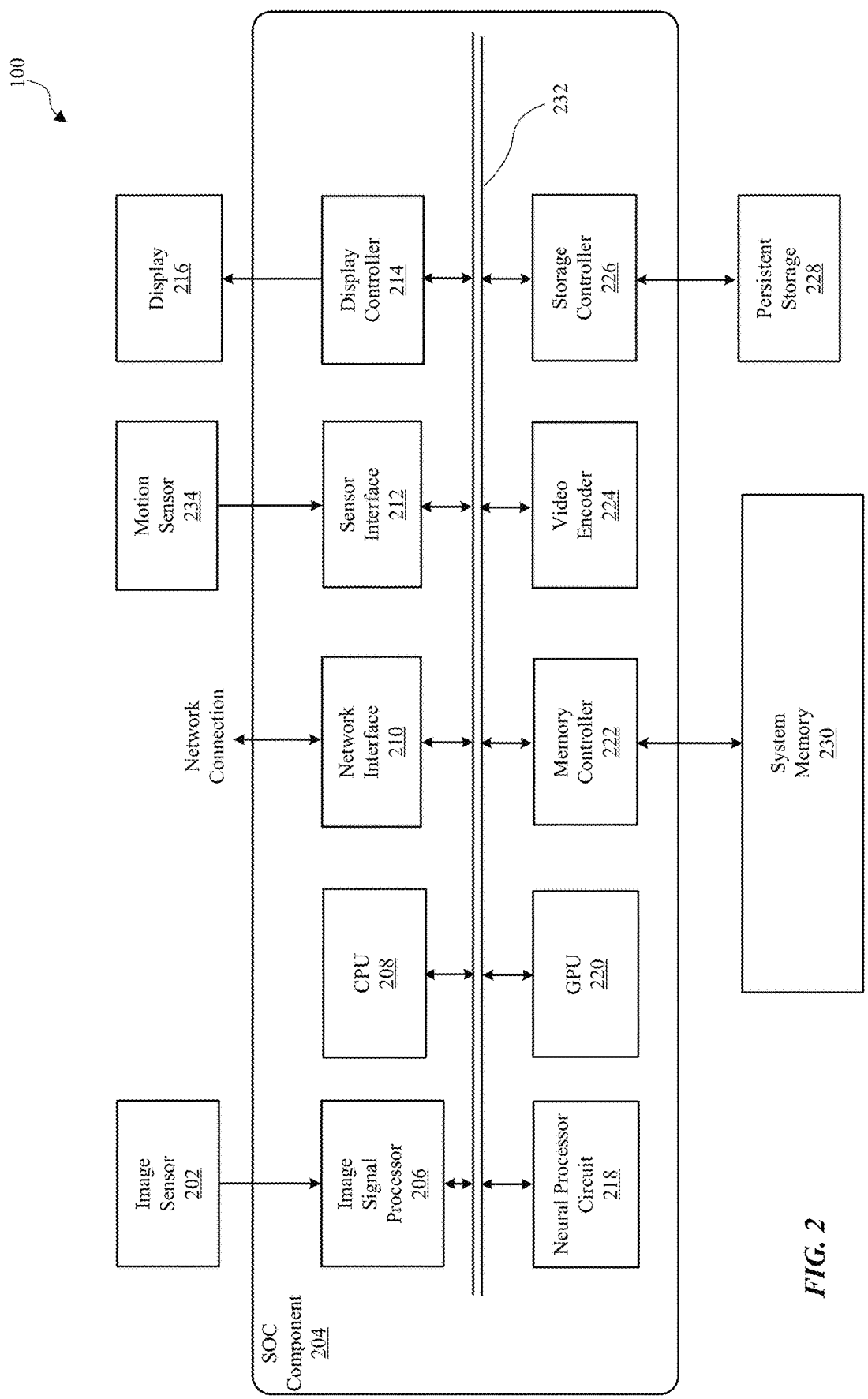
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computations used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computational operations such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tan h), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network are discussed as an example, the neural processor circuit 218 may also be used for the operations of other types of machine learning models, such as a kernel SVM. For simplicity, this disclosure may describe operations of neural networks, but the operations can also be used for other types of machine learning models.

Figure 3:
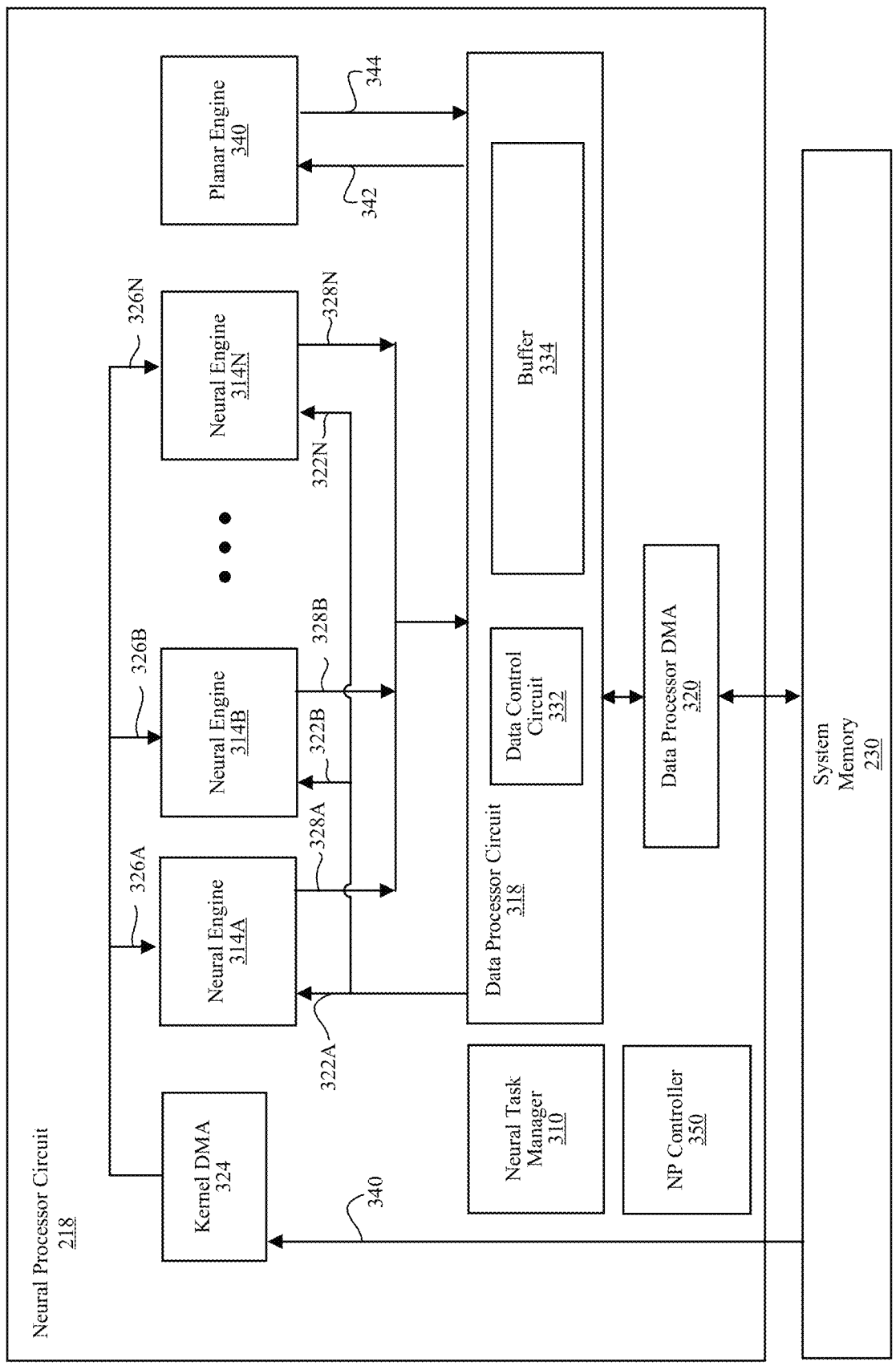
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred to as "neural engines 314" and individually also referred to as "neural engine 314"), kernel direct memory access (DMA) 324, data processor circuit 318, data processor DMA 320, planar engine 340, and neural processor (NP) controller 350. Neural processor circuit 218 may include fewer components than what are illustrated in FIG. 3 or include additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. These computing operations may be referred to as I/O bound computations and are also referred to as "non-convolution operations" herein. In contrast, neural engines 314 may focus on complex computation such as convolution operations whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduces a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that store the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a data control circuit 332 and a buffer 334. Buffer 334 is temporary storage for storing data associated with operations of neural processor circuit 218, such as input data that is transmitted from system memory 230 (e.g., data from a machine learning model) and other data that is generated within neural processor circuit 218. The input data may be transmitted from system memory 230. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N (also referred to as "neural input data" herein) for feeding to corresponding neural engines 314A through 314N and input data 342 (also referred to as "planar input data" herein) for feeding to planar engine 340, as well as output data 328A through 328N from each of neural engines 314A through 314N (also referred to as "neural output data" herein) and output data 344 from planar engine 340 (also referred to as "planar output data" herein) for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as planar input data 342 to planar engine 340. Likewise, planar output data 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Data control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Data control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes. Details of data control circuit 332 are described below in detail with reference to FIG. 9.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a portion of the input data from a source (e.g., system memory 230) for storing in buffer 334, and a write circuit that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without the involvement of CPU 208.

Neural Processor (NP) controller 350 is a control circuit that performs various operations to control the overall operation of neural processor circuit 218. NP controller 350 may interface with CPU 208, program components of neural processor circuit 218 by setting register in the components and perform housekeeping operations. NP controller 350 may also initialize components in neural processor circuit 218 when neural processor circuit 218 is turned on.

Example Neural Engine Architecture

Figure 4:
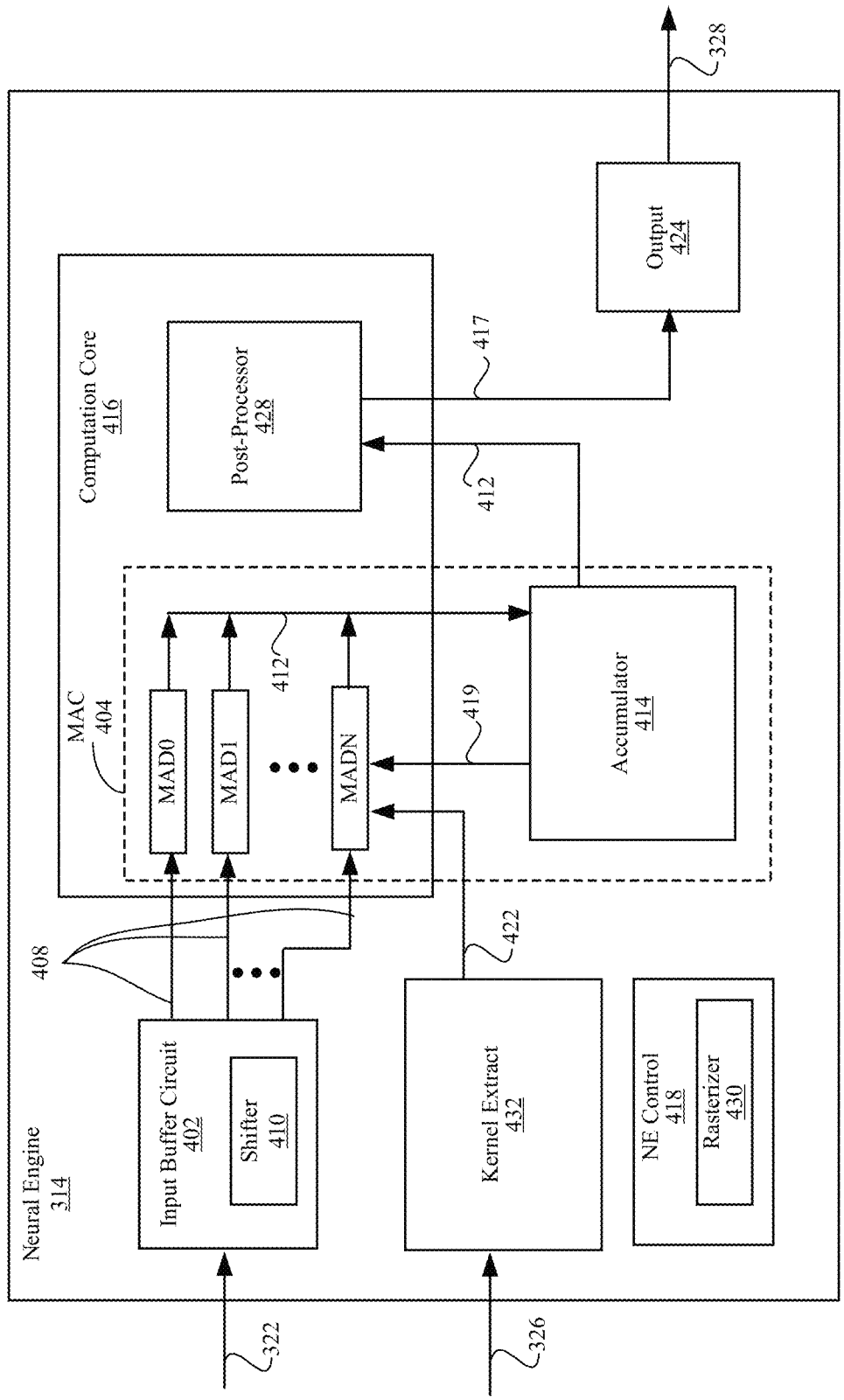
FIG. 4 is a block diagram of a neural engine in the neural processor circuit, according to one embodiment.

FIG. 4 is a block diagram of neural engine 314, according to one embodiment. Neural engine 314 is a circuit that performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate portion 408 of data for a current task or process loop to computation core 416 for processing. Input buffer circuit 402 may include a shifter 410 that shifts read locations of input buffer circuit 402 to change portion 408 of data sent to computation core 416. By changing portions of input data provided to computation core 416 via shifting, neural engine 314 can perform multiply-accumulate for different portions of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and the remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the portion 408 of the input data and a corresponding kernel coefficient in kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to the MAC circuit while data stored in a second subunit of accumulator 414 is sent to post-processor 428.

Post-processor 428 is a circuit that performs further processing of values 412 received from accumulator 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (portions of data) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a portion of the input data, such as data processed by planar engine 340 or data processed a prior cycle of neural engines 314 having a size that produces output values that fit into accumulator 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a portion of input data, (ii) data from neural engine 314 or (iii) data from a prior cycle of planar engine 340 that can be processed simultaneously at planar engine 340.

Rasterizer 430 may perform the operations associated with dividing the input data into smaller units (portions) and regulate the processing of the smaller units through the MACs 404 and accumulator 414. Rasterizer 430 keeps track of sizes and ranks of portions of the input/output data (e.g., groups, work units, input channels, output channels) and instructs the components of a neural processor circuit 218 for proper handling of the portions of the input data. For example, rasterizer 430 operates shifters 410 in input buffer circuits 402 to forward correct portions 408 of input data to MAC 404 and send the finished output data 328 to data buffer 334. Other components of neural processor circuit 218 (e.g., kernel DMA 324, data processor DMA 320, data buffer 334, planar engine 340) may also have their corresponding rasterizers to monitor the division of input data and the parallel computation of various portions of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine Architecture

Figure 5:
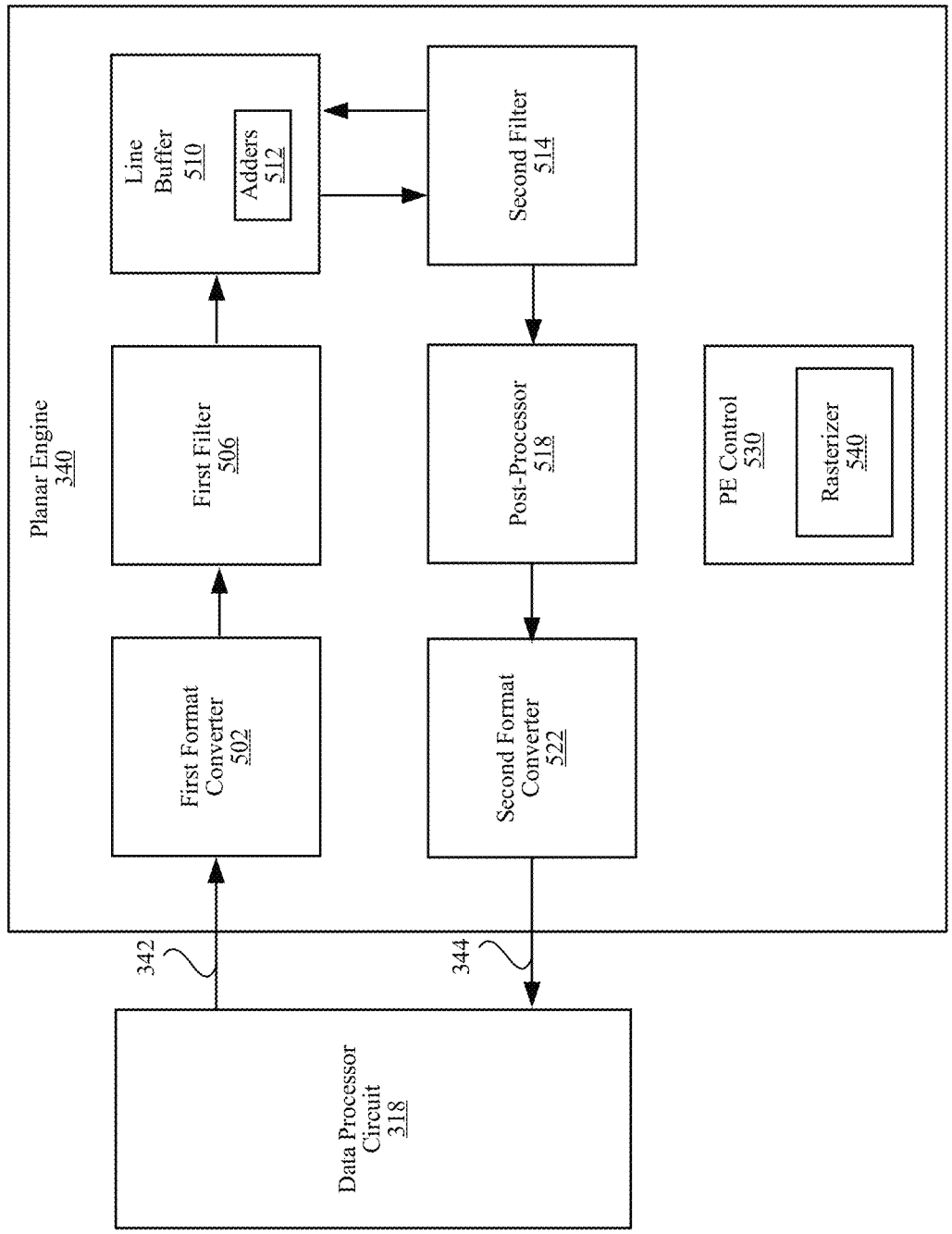
FIG. 5 is a block diagram of a planar engine in the neural processor circuit, according to one embodiment.

FIG. 5 is a block diagram of planar engine 340, according to one embodiment. Planar engine 340 is a circuit that is separated from neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5A. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or portions of input data and/or loops for processing the input data in planar engine 340. Rasterizer 540 may control the fetch of portions to planar engine 340 in each operation cycle and may monitor the size and rank of each portion being processed by planar engine 340. For example, smaller portions of a dataset may be fetched as input data 342 in a raster order for processing at planar engine 340 until all portions of the source dataset are processed. In fetching the portions, rasterizer 540 monitors the coordinate of the portion in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such a case, planar engine 340 fetches different portions of the dataset as input data 342 in multiple operating cycles. The fetched portion may partly overlap with a previously fetched portion and/or the next portion to be fetched. In one embodiment, the portion of overlapping data is fetched only once and reused to reduce the time and power consumption cost of planar engine 340 in fetching data.

Operation of Segmenting of Data for Processing at Neural Processor Circuit

Source data is typically split into smaller pieces of data for parallel processing at multiple neural engines 314. Often multiple cycles of operations are performed to generate output for a task associated with a neural network. A compiler executed by CPU 208 analyzes the hierarchy and nodes of the neural network and determines how the source data is to be segmented based on the hardware constraints of the neural processor circuit 218. One of the functions of the compiler is to determine how the source data is to be split into smaller data units for processing at the neural engines 314, and how the processing is to be iterated in loops to produce the result for tasks.

Figure 6A:
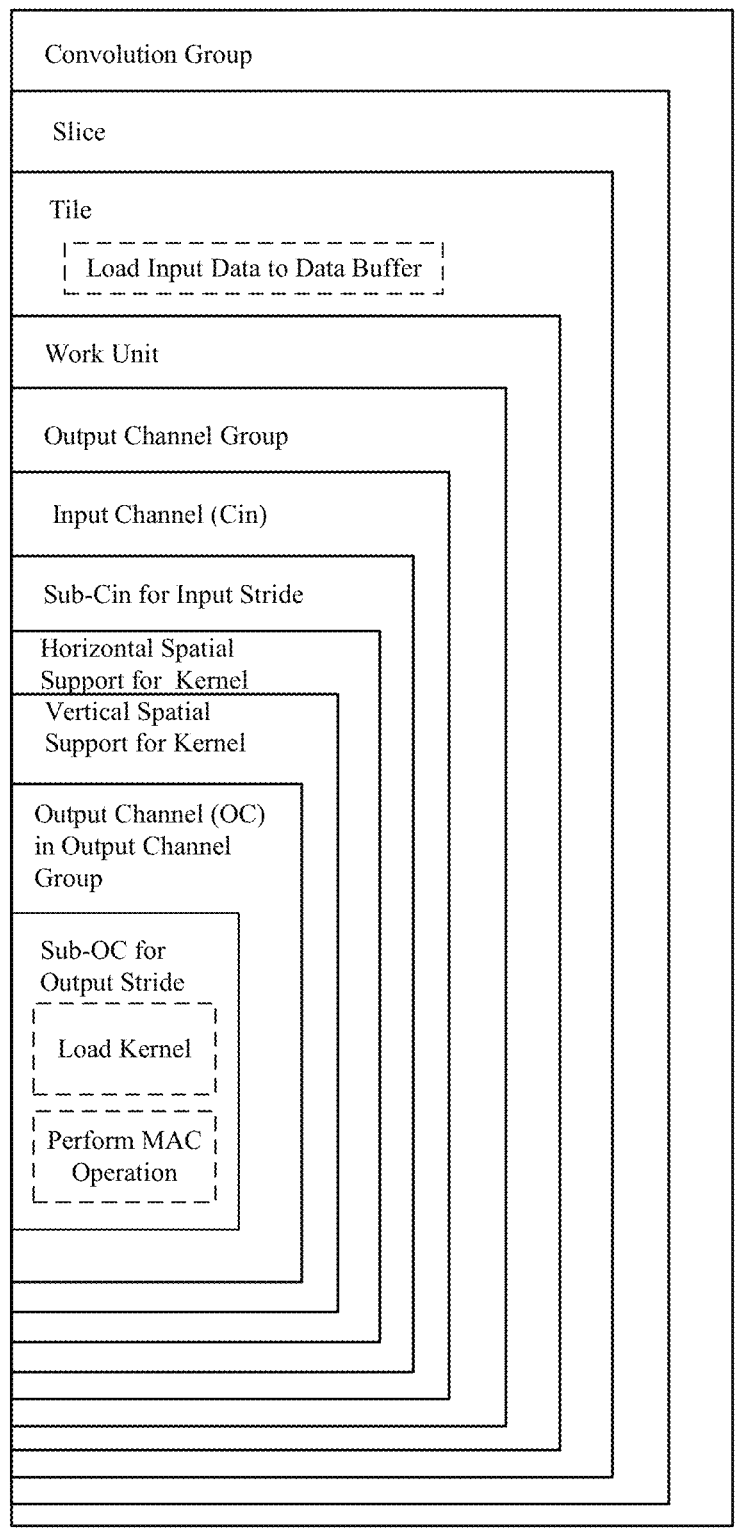
FIG. 6A is a conceptual diagram illustrating loops for processing input data at the neural processor circuit, according to one embodiment.

FIG. 6A is a conceptual diagram illustrating loops for processing the source data at neural processor circuit 218, according to one embodiment. The outermost loop represents processing for a convolution group, if a group convolution involving multiple convolution groups is used. Group convolutions are convolutions where input data of the input channels in each group are used only for generating output data of output channels of each group but are not used for generating output data for output channels of other groups. Hence, each group of the group convolution can be treated as a separate convolution operation.

Figure 6B:
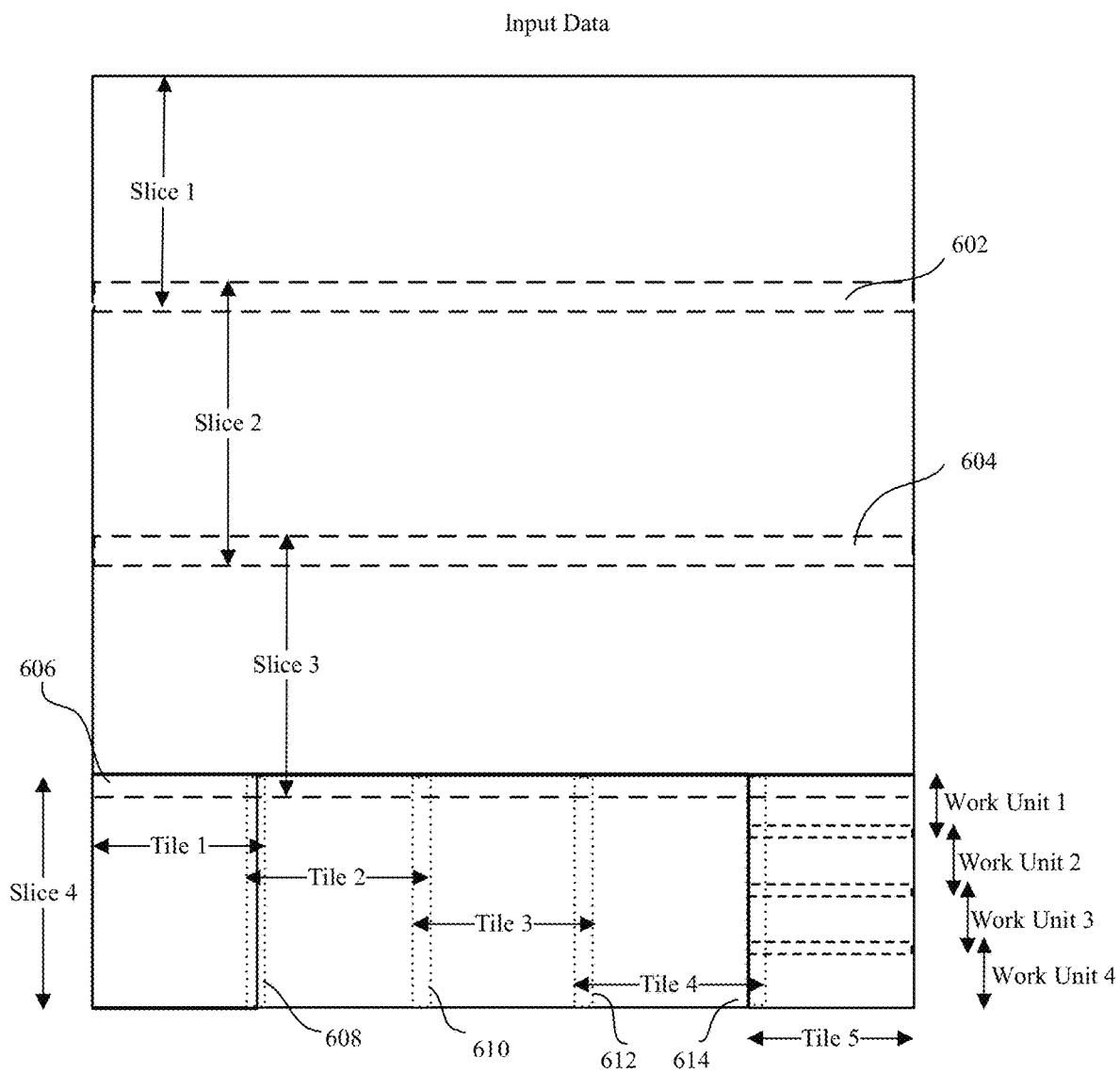
FIG. 6B is a conceptual diagram illustrating segmenting the input data into slices, tiles and work units, according to one embodiment.

In the loop for each convolution group is a processing loop for a slice of the source data. The entire source data for a convolution operation is segmented into multiple strips of slices in an overlapping manner, as shown in FIG. 6B. The overlapping portions 602, 604, 606 are parts of the source data that are overfetched in two adjacent slices to provide spatial support for a corresponding kernel. The second outermost loop performs a convolution operation for each slice in the input data. Within the loop for a slice is a processing loop for a tile of the slice. Each slice is segmented into a plurality of tiles, as shown in FIG. 6B. The overlapping portions 608, 610, 612, 614 are parts of the input data in slice 4 that are overfetched in two adjacent tiles to provide spatial support for a corresponding kernel. The rightmost tile will typically have a width smaller than other tiles of the slice. In one embodiment, input data for each tile is loaded onto data processor circuit 318 in a read cycle and reused for operations in processing loops for the tile. In the processing loop for the tile is a processing loop for a work unit. Each tile is segmented into multiple work units as shown in FIG. 6B. A work unit is a portion of the input data having a size that produces output values that fit into accumulator 414 of neural engine 314 during a single cycle of the computation core 416. Although the shape of each work unit is shown as a horizontal strip in FIG. 6B, the shape of the work unit can be different depending on the shape and size of the tile. The work units also have overlapping parts that represent overfetched to provide support for a corresponding kernel. Especially, work units for the last tile of a slice may have a shape of a vertical strip if the tile is tall. In one or more embodiments, the size of each work unit is 256 bytes. In such embodiments, for example, work units can be shaped to one of 16×16, 32×8, 64×4, 128×2 or 256×1 dimension.

For each work unit, an internal processing loop may be provided for an output channel group (OCG). The number of output channels produced for a given work unit by a single cycle of the computation core 416 is referred to as an OCG. Depending on operation modes, each neural engine 314 may process output data of different numbers of output channels (e.g., 8 channels, 32 channels) for a single load of input data into its input buffer circuit 402.

For each output channel group, an internal processing loop may be provided for an input channel (Cin). If an input stride is implemented to skip certain input data, loops for sub-input channels (Sub-Cin) may be provided within the processing loop for the input channel (Cin).

For each input channel or each sub-input channel, internal loops are provided for processing horizontal spatial support for a kernel and the vertical support within each horizontal spatial support. The spatial support refers to the input data for convolution with the kernel and includes overfetched input data for performing convolution at the edges of the input data.

Overfetch refers to fetching additional input data in the current slice, tile or work unit so that the proper dimension of input data can be provided for convolution with a kernel. In one or more embodiments, overfetch is performed vertically between slices to obtain additional rows of input data (shown as overlapping portions 602, 604, 606 in FIG. 6B), horizontally between tiles to obtain additional columns of input data (shown as overlapping portions 608, 606, 612, 614 in FIG. 6B), and vertically between work units within a tile to obtain additional rows of input data.

For each spatial support for the kernel, an internal processing loop for an output channel (OC) is provided to generate output data for each output channel (Cout). In cases where the output stride implements a spatial upsampling, an additional inner loop for processing each sub-output channel is provided. Loading of kernel coefficients and MAC operations are performed within the loop for the output channel (OC) or sub-output channel if an output stride is implemented, to generate output data for the output channel (OC) or sub-output channel.

The nested loop structure of FIG. 6A is merely illustrative. Loops may be omitted, added or structured differently depending on various factors. For example, if only a single convolution group is used, the outermost loop may be removed. Further, the loop structure for the horizontal spatial support and the vertical spatial support may be reversed.

In one or more embodiments, the operations associated with dividing the input space into smaller units and processing these smaller units are described above with reference to FIGS. 6A and 6B are performed by rasterizers 430, 540, 718, 720, 722 in various components of neural processor circuit 218. A rasterizer is a circuit in various components of neural processor circuit 218 that keeps track of the segment of the input/output data (e.g., group, work unit, input channel, output channel) and instructs the components of neural processor circuit for proper handling of the segment of the input data. For example, rasterizer 720 in buffer DMA 320 tracks tiles and slices received from system memory 230 while rasterizer 718 in data processor circuit 318 broadcasts in sequence work units for processing by the neural engines 314. Rasterizer 724 in kernel DMA 324 determines which kernels are to be received and distributed to neural engines 314, while rasterizers 430 in neural engines 314 operate shifters 410 in input buffer circuits 402 to forward correct portions 408 of input data to MAC 404, and send the finished output data 328 to the data processor circuit 318.

Figure 7:
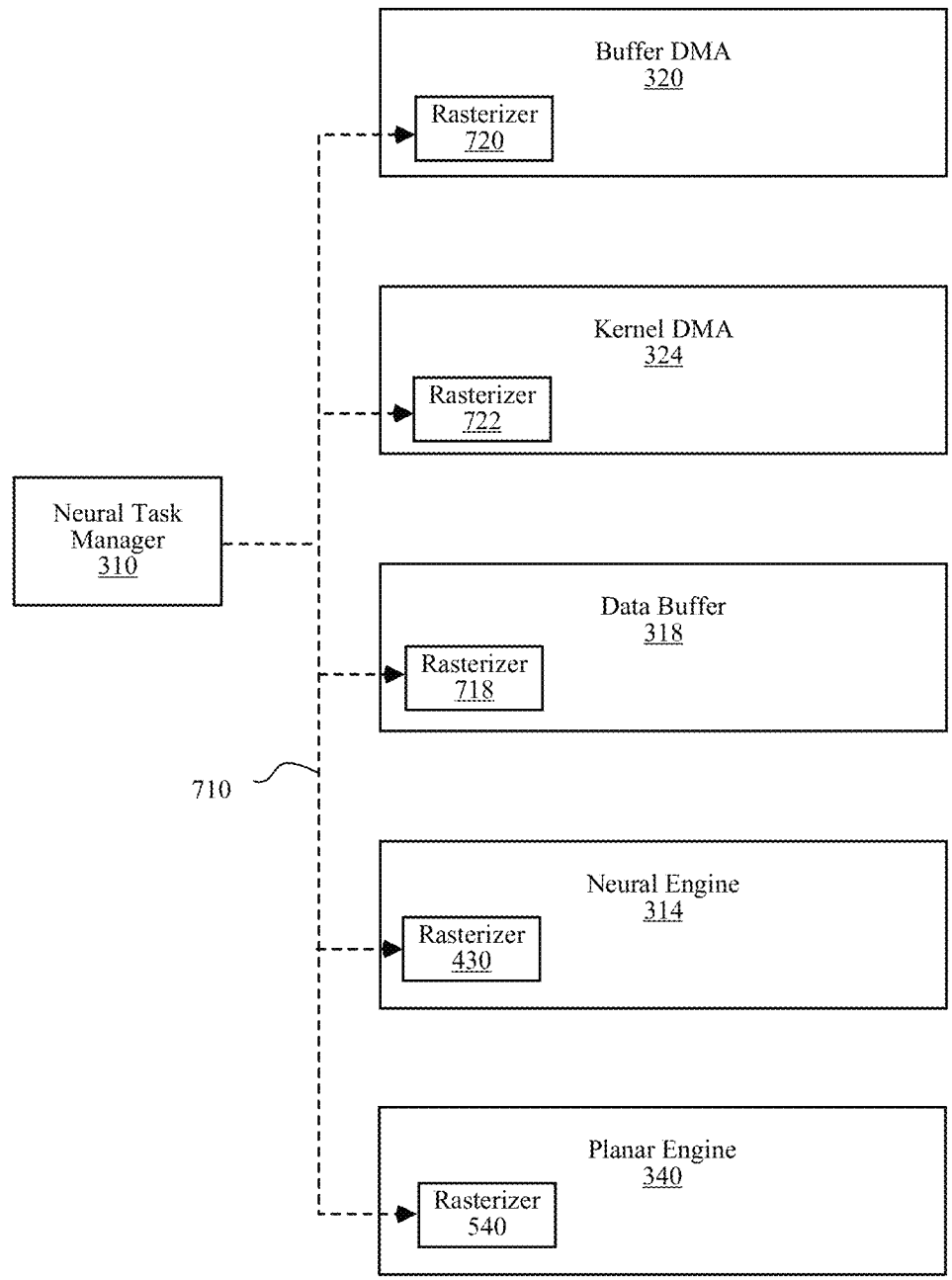
FIG. 7 is a diagram illustrating programming of rasterizers in components of the neural processor circuit, according to one embodiment.

FIG. 7 is a diagram illustrating the programming of rasterizers 430, 540 718, 720, 722 in components 314, 318, 320, 322, 340 of the neural processor circuit 218, according to one embodiment. To perform their functions, each of the rasterizers 430, 540, 718, 720, 722 receives task information 710 indicating how the input data and/or kernel data are to be segmented and to be handled by each component of the neural processor circuit 218. The task information includes information about particulars of the current layer (e.g., dimensions of input and output data, the dimension of an associated kernel, types of padding at the boundaries of input data). Rasterizers 430, 540, 718, 720, 722 may also receive constraints on their operations (e.g., whether to allow or disallow tile width over a threshold).

By providing rasterizers in different components of neural processor circuit 218, overhead in data transmitted between the components of the neural processor circuit 218 may be reduced. If a single central rasterizer is provided to control different components of the neural processor circuit 218, kernel data, input data, and output data transmitted between the components may be needed in these data to identify the associated position in the loops of the task such as convolution group, tile, slice, work unit, input channel and output channel. By using distributed rasterizers, no separate metadata is needed to transmit the kernel data, input data and output data among components of the neural processor circuit 218.

Example Work Unit Reshaping Circuitry

Figure 8:
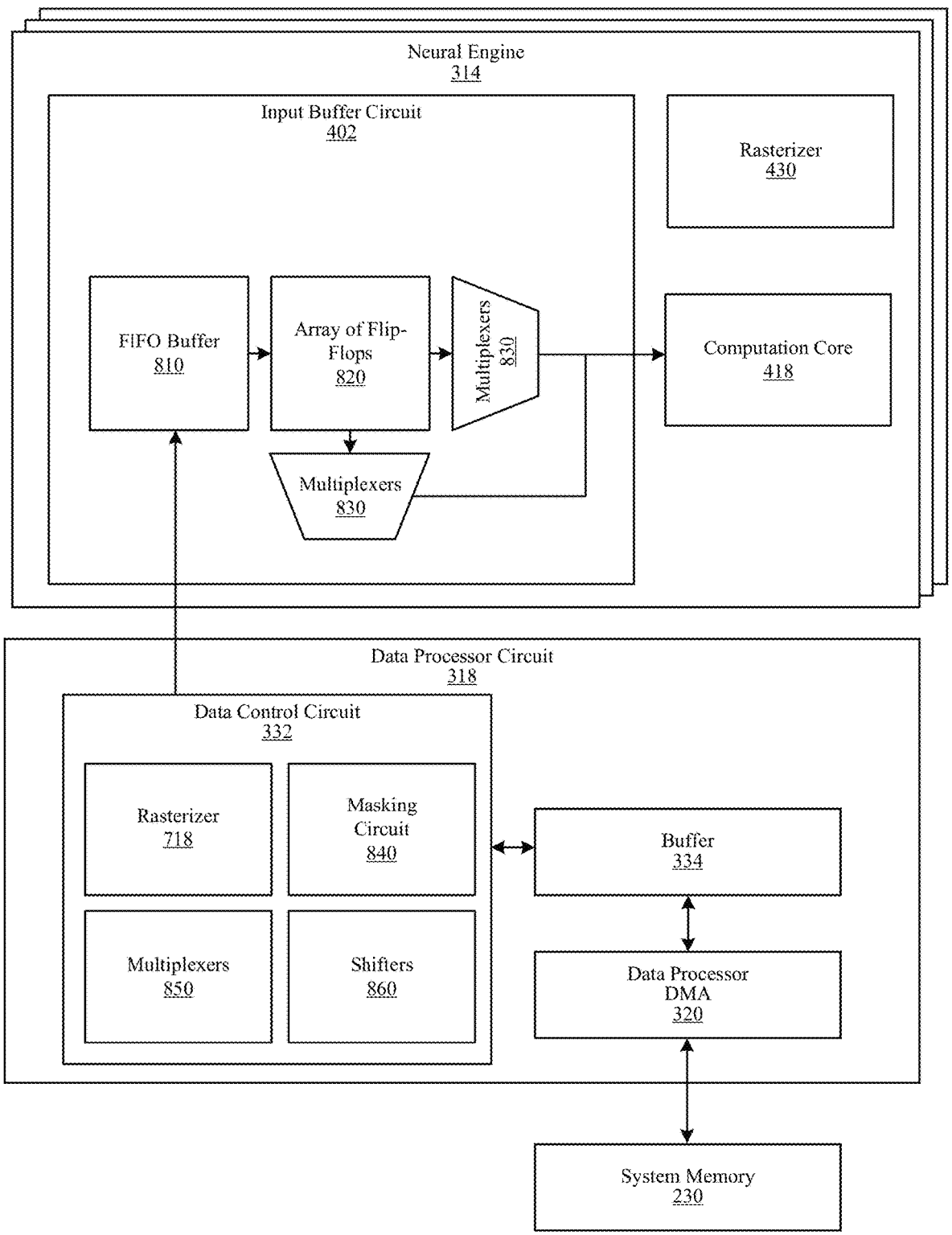
FIG. 8 is a block diagram illustrating processing and rearranging of data work units, according to one embodiment.

FIG. 8 is a block diagram illustrating example circuitry of neural processor circuit 218 that may be used to reshape data work units, according to an embodiment. FIG. 8 may correspond to part of the circuitry shown in FIGS. 3 and 4 with further details of data control circuit 322 and input buffer circuit 402 being shown. Input buffer circuit 402 of neural engine 314 arranges input data into a certain size and shape for computation core 416 to fetch input data in an orderly manner, and thereby improve the operation of computation core 416. For example, input buffer circuit 402 uses a pre-set hardware arrangement to define the size and shape of the input data work unit for computation core 416. Data control circuit 332 fetches source data from buffer 334 or system memory 230 and reshapes the work unit into the size and shape that are compatible to input buffer circuit 402. Data processor circuit 318 may be in communication with a plurality of neural engines 314.

Data processor circuit 318 serves as the buffer and the data processing unit for the inputs and outputs of neural engines 314 and planar engine 340 (for simplicity, planar engine 340 is not shown in FIG. 6). Data processor circuit 318 may fetch source data using data processor DMA 320 to get data from system memory 230 or fetch source data from buffer 334. The source data, saved in system memory 230, may be any suitable dataset such as an image or a video captured by the electronic device. The source data may be fetched into a section of the buffer 334 in data processor circuit 318. Data control circuit 332 performs one or more of dividing, reshaping and resizing of the source data. Various portions of the source data are broadcasted (e.g., sent simultaneously) to one or more neural engines 314, each of which may cache a portion of data in its buffer. Neural engines 314 perform computations such as convolution operations on the input data to generate output data. Output data are written back to a section of buffer 334 and may be destined as the input of a subsequent layer of the neural network. The output data may be retained in buffer 334 if buffer 334 has sufficient space to hold the output data. Otherwise, the output data may be written back to system memory 230 via data processor DMA 320.

In neural engine 314, input buffer circuit 402 includes two stages of buffer circuits that temporarily store input data for computation core 416. The first stage of the buffer circuit includes a first-in-first-out (FIFO) buffer 810. The second stage of the buffer circuit includes an array of flip-flops 820 that are coupled to multiplexers 830 for selecting and shifting input data. Neural engine 314 operates on work unit blocks with a predetermined size. The input data may be divided into blocks and one of the blocks is first pre-fetched to FIFO buffer 810. After the current block is transmitted to the array of flip-flops 820 for computation, another block for the next cycle is pre-fetched to FIFO buffer 810 to reduce or eliminate idle cycles.

FIFO buffer 810 serves as an interface between data processor circuit 218 and neural engine 314. FIFO buffer 810 is loaded by a broadcast from data processor circuit 218, which transmits a work unit block from data control circuit 332. FIFO buffer 810 may include two or more rows of memory cells. Each row of the memory cells may be used to store a work unit block. When a row is fetched to the array of flip-flops 820, data blocks are shifted toward the exit row.

The second stage of the buffer circuit includes the array of flip-flops 820 and multiplexers 830. The array of flip-flops 820 may include N rows of flip-flops. Each flip-flop is used to store a value of a work unit block. A work unit block fetched from FIFO buffer 810 is stored in the array of flip-flops 820. The array of flip-flops 820 may have a fixed physical arrangement and a fixed number of flip-flops 820 so that the work unit block size is fixed. Neural engine 314 allows the work unit blocks to be of different shapes than the work units fetched by computation core 416. For example, the supported shapes may be permutations of various dimensions that result in a size that corresponds to the number of flip-flops in the array 820. Multiplexers 830 are located downstream of the array of flip-flops 820 to select different values in different orders to generate work units of different shapes. Multiplexers 830 may be part of the shifter circuit 410 shown in FIG. 4.

The shapes of work units can be changed for each tile of data. As discussed above in FIG. 6B, input data can be split into multiple smaller units. The hierarchy of smaller units (portions of data) may be convolution groups, slices, tiles, work units. Work units are generated by splitting a tile. The shapes of work units depend on the dimension of their corresponding tile. Neural engines 314 support different shapes of work units. For example, in some embodiments, the array of flip-flops 820 is in a fixed size that includes N rows of flip-flops. In one embodiment, the array of flip-flops 820 is in the size of 16 rows of 32 bytes flip-flops with a total size of 512 bytes. The work units are in the size of 256 bytes and the extra space in the array of flip-flops 820 is reserved for overfetch. Neural network 314 supports various shapes of work units of the same size. For example, work units can be shaped to one of 16×16, 32×8, 64×4, 128×2 or 256×1 dimension. Regardless of the shape, a work unit is fetched to the array of flip-flops 820. Multiplexers 830 select the data values of the work unit in different orders to form sliding windows to generate the proper shape of the work unit for the computation core 416.

To provide efficient wiring and spacing of circuitry for placing of multiplexers 830 to support different work unit shapes, the number of flip-flops and the number of rows of flip-flops in array 820 may be in the power-of-two (P2). Based on the hardware configuration, the shapes of work units supported by neural engine 314 are also in P2. For example, the shapes are multiples of P2 dimensions such as 16×16, 32×8, etc. The P2 shapes improve the speed, size, and power efficiency of each neural engine 314 by reducing or eliminating idle cycles of the neural engine 314.

While the P2 shapes supported by neural engine 314 provide performance improvement, the P2 granularity of the work unit shape may cause a loss of neural engine utilization for certain types of neural networks. For example, in CNNs, activation layer sizes are often in 71×71, 35×35, 17×17 etc. Odd-number shapes can account for the majority of shapes of data in various convolution cycles in neural networks, such as data size in various convolution layers and activation layers. These types of shapes may get poor utilization on the P2 shape configuration. For example, a 17×17 shape needs three 32×8 work units for a total of 32×24 space, which results in a utilization of 38%. A 35×35 shape needs nine 64×4 work units to cover for a total of 64×36 space, which results in a utilization of 53%. Alternatively, a 35×35 shape may be divided into two slices. The first slice would use six 16×16 work units to get to 48×32 shape. The second slice would be the remaining 35×3 shape, which could be covered by a single 64×4 shape. In total, seven work units will need to be used with a utilization of 68%.

Data processor circuit 318 may fetch data in non-power-of-two (NP2) shapes. Data control circuit 332 reshapes NP2 source data to P2 shape for neural engine 314 to process. The reshaping of source data may be performed as part of the data broadcast process through data control circuit 332 and the write-back process to reshape the P2 output data generated by neural engine 314 back to NP2 shape. The reshaping by data control circuit 332 allows a 17×17 shape to be covered by two work units by using two 24×10 work units for a total of 24×20 space, which results in a utilization of 56% that is improved from the utilization of 38% by using only P2 work units. In another example, a 35×35 shape may be covered by six 40×6 work units for a total of 40×36, which results in a utilization of 80%. In both examples, using NP2 work units improve the utilization of neural engines 314 and reduces the number of convolution cycles. The overall performance and speed of neural processor circuit 218 are improved.

Data control circuit 332 includes various circuit components for performing reshaping and other data processing operations for the source data before the source data is broadcasted to neural engine 314. Data control circuit 332 may include rasterizer 718, masking circuit 840, multiplexers 850, and shifters 860. Data control circuit 332 fetches source data having an NP2 shape from a source such as buffer 334 or system memory 230. Data control circuit 332 reshapes the NP2 source data to a P2 shape. In some cases, before reshaping, data control circuit 332 may also shift the source data and perform padding of zeros at the periphery of the source data. The padding may be used for source data that is about to be convolved with a kernel in order to set the output data to a particular size. The reshaped source data is broadcasted to one or more neural engines 314 as input work units for neural engines 314.

Rasterizer 718 and rasterizer 430 monitor the reshaping, segmenting of tiles into work units, and tracking of the division of source data. For example, rasterizer 718 provides a command to enable NP2 work units. Rasterizer 718 also works with rasterizer 430 to keep track of the reshaping of work units to P2 work units in neural engine 314 and the reshaping of output back to an NP2 shape. Rasterizer 718 may support various NP2 shapes. In some embodiments, the supported NP2 shapes may have predetermined shapes such as 24×10 and 40×6. In other embodiments, the supported NP2 shapes may be in any suitable shapes. In an NP2 mode, rasterizer 718 may segment a slice into tiles whose heights are set to an NP2 value, such as 6 or 10 rows. As such, the work units generated from the tile is in an NP2 shape.

Masking circuit 840 and multiplexers 850 are used to perform the reshaping and selection of the source data. Masking circuit 840 and multiplexers 850 receive commands from rasterizer 718 in performing reshaping and selection. Reshaping can be performed on the source data to reshape an NP2 shape to a P2 shape and may also be performed when output data returns to data processor circuit 318. Masking circuit 840 selects relevant data from data broadcasted to neural engines 314 and also selects output data that is stored in buffer 334. For example, in one case, masking circuit 840 removes at least a subset of reshaped source data prior to transmitting the reshaped source data to neural engines 314.

Shifters 860 may include any suitable shifters such as barrel shifters that move the bits in source data by one or more positions for the purposes of kernel support and padding. Convolution between input data and kernel reduces the size of the output data compared to the input data unless padding in proportion to the kernel width is performed on the input data. For example, a dimension of output data Wout is related to a dimension of input data Win and kernel width Kw by the relation Wout=Win−Kw+1. If output data is to be kept at the same size and shape as the input data, data control circuit 332 pads zeros to be the outer periphery of input data to increase the size of source data. Shifters 860 are used to shift the source data before zeros are added to the data. For NP2 reshaping, padding may first be performed before the NP2 data is reshaped to a P2 shape.

Example Work Unit Reshaping

Figure 9A:
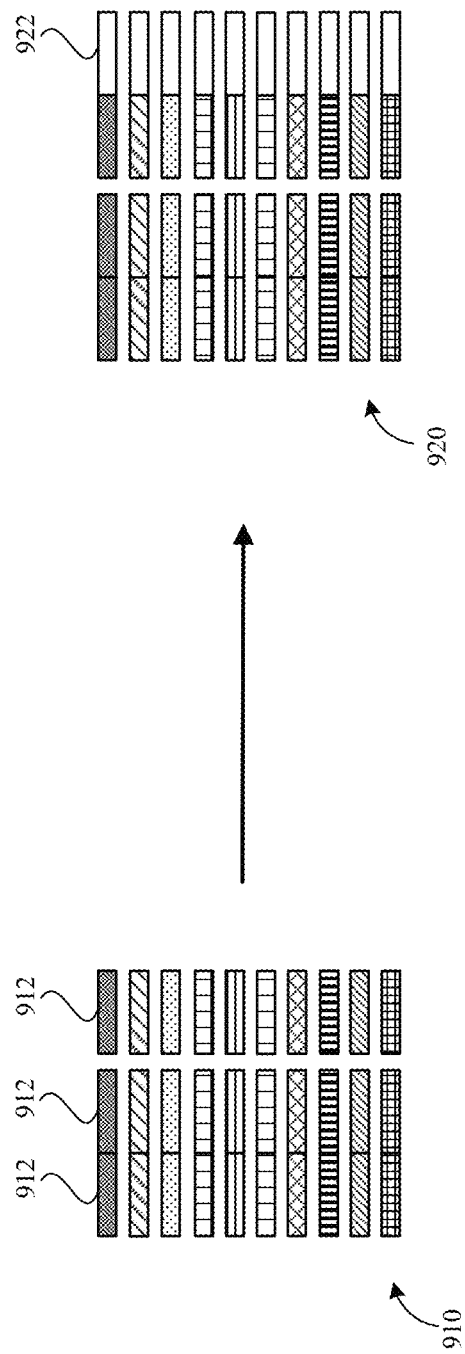
FIGS. 9A and 9B are conceptual diagrams illustrating the reshaping of an NP2 work unit to a P2 work unit, according to one embodiment.
Figure 9B:
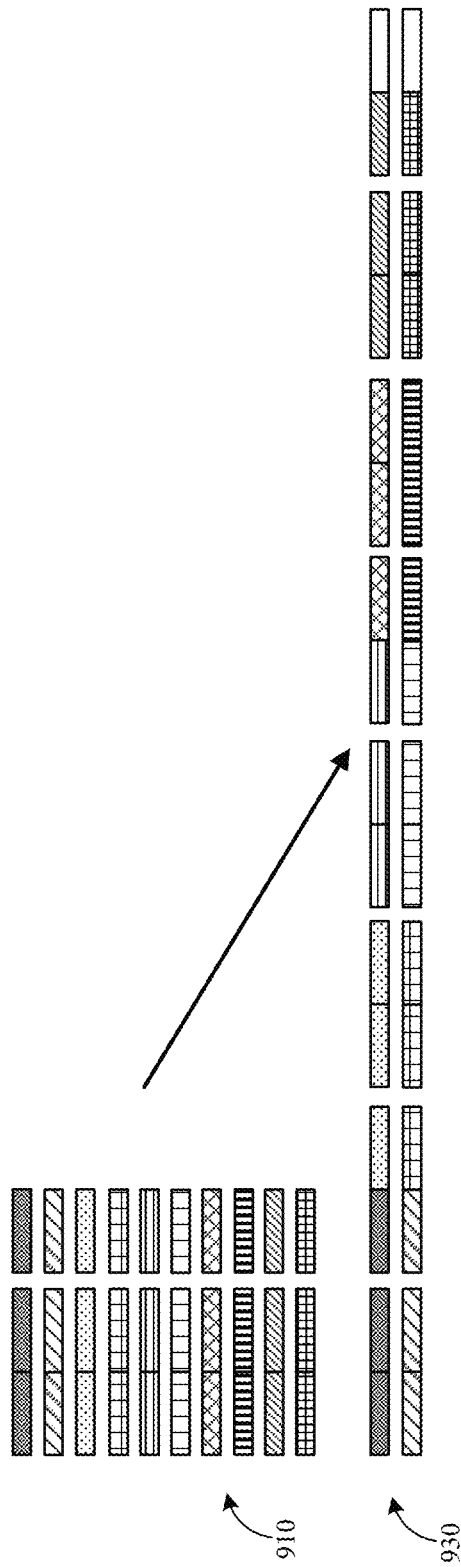
Figure 9C:
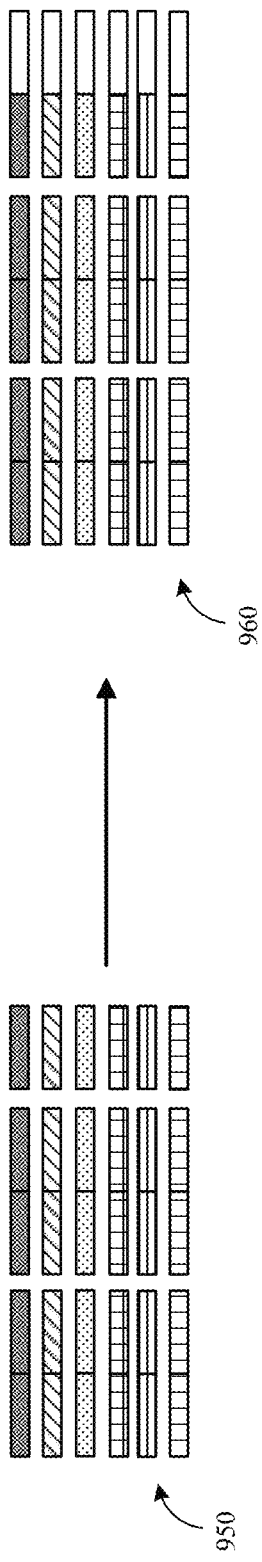
FIGS. 9C and 9D are conceptual diagrams illustrating the reshaping of another NP2 work unit to a P2 work unit, according to one embodiment.
Figure 9D:
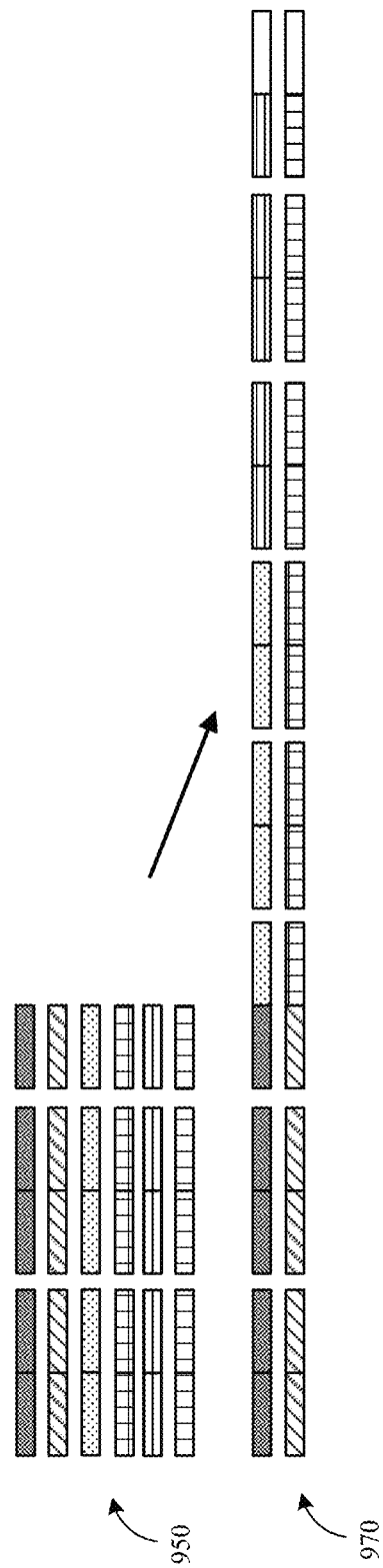

FIGS. 9A and 9B are conceptual diagrams illustrating the reshaping of an NP2 work unit to a P2 work unit, according to one embodiment. Data processor circuit 318 may conduct reshaping operations for various NP2 shapes. In one embodiment, data processor circuit 318 fetches source data in two or more NP2 shapes. FIGS. 9A and 9B illustrate a non-limiting example of a 24×10 byte NP2 shape that is reshaped into a P2 shape of 128×2. The specific numbers discussed in FIGS. 9A, and 9B, and subsequent FIGS. 9C, 9D, and 10 are for illustration only. In various examples, a data processor circuit 318 may operate in other different NP2 and P2 shapes and the array of flip-flops 820 may also be in different sizes and shapes.

In FIG. 9A, a padding operation of an NP2 shape of 24×10 without NP2 reshaping is illustrated. To provide an efficient configuration, the array of flip-flops 820 may be arranged in P2 rows. For example, in one embodiment, each row of the array 820 is 32 bytes, thus supporting a 16-byte row for a work unit because the rest is reserved for over-fetch. The array of flip-flops 820, in this example, may process a work unit with a size of 256 bytes. Source data 910 has the shape 24×10. Each rectangular box 912 represent 8 bytes and various filled patterns each corresponds to a row in the source data 910 so that how the rows are reshaped and realigned are easier to be tracked. The white boxes 922 represent spaces that are padded with zeros. Without the NP2 shape, each row of 24 bytes occupy two rows of 16-byte flip-flops because the array of flip-flops 820 operates in 16-byte rows. As a result, the 24×10 source data 910 is padded to a 32×10 source data 920. In this example, 25% of the 32×10 source data are zeros and those spaces are not utilized. Also, since a 32×10 source data 920 has a size of 320 bytes, which exceed the size of 256-byte work unit used in the array of flip-flops 820, two work units will need to be used, further reducing the utilization.

In FIG. 9B, data processor circuit 318 reshapes NP2 source data 910 into a P2 work unit with a shape of 128×2. The first two rows of source data 910 are moved to the work unit 930, the third and fourth rows of source data 910 are rearranged to following the first two rows, and the fifth and sixth rows of source data 910 follow the third and fourth rows, and so on. By reshaping the NP2 source data 910, the 24×10 shape is rearranged to a 120×2 shape. Only the last 8 bytes in each row are padded in order to obtain a P2 work unit with the shape of 128×2, and hence, the utilization is improved compared to the padding operation in FIG. 9A. Also, only a single work unit is needed to represent the 24×10 source data 910.

FIGS. 9C and 9D are conceptual diagrams illustrating another reshaping of an NP2 work unit to a P2 work unit, according to one embodiment. In FIG. 9C, a padding operation of an NP2 shape of 40×6 without NP2 reshaping is illustrated. Again, in this example, each row of work unit represented in the array of flip-flops 820 is 16 bytes and the size of the work unit is 256 bytes. Without NP2 reshaping, the 40×6 source data 950 is padded to a 48×6 source data 960. Six 8-byte groups of zeros are padded to the source data. Similar to FIG. 9A, since the 48×6 source data 960 has a size of 288 bytes, which exceed the size of 256-byte work unit used in the array of flip-flops 820, two work units will need to be used, further reducing the utilization.

In FIG. 9D, data processor circuit 318 reshapes NP2 source data 950 into a P2 work unit with a shape of 128×2. The first two rows of source data 950 are moved to the work unit 970, the third and fourth rows of source data 950 are rearranged to following the first two rows, and the fifth and sixth rows of source data 950 follow the third and fourth rows. By reshaping the NP2 source data 950, the 40×6 shape is rearranged to a 120×2 shape. Only two groups of 8-bytes of zeros are padded in order to obtain a P2 work unit with the shape of 128×2. The utilization is improved compared to the padding operation shown in FIG. 9C. Also, a single work unit is needed to represent the 40×6 source data 950.

Figures 10A, 10B:
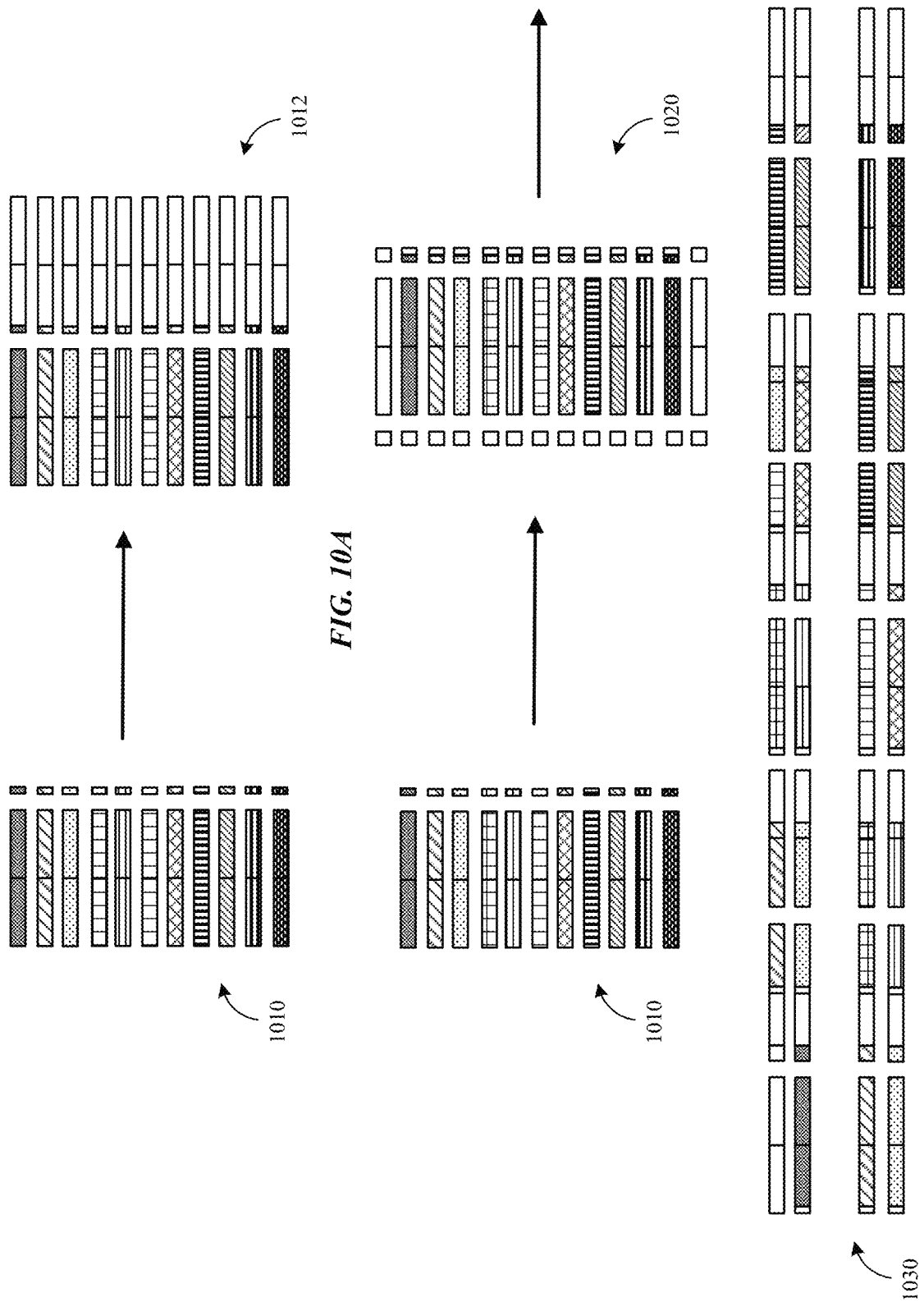
FIGS. 10A and 10B are conceptual diagrams illustrating padding and reshaping of NP2 work unit, according to one embodiment.

FIGS. 10A and 10B are conceptual diagrams illustrating a padding operation followed by an NP2 reshaping, according to an embodiment. In this example, a source data 1010 with a dimension of 17 bytes is illustrated. A dimension of 17 bytes is rather common in various neural networks because 17×17 is a common activation layer size. Because of the size of 17, in a padded work unit 1012, each row in the source data 1010 occupies a 16-byte unit (two rectangular boxes) and has one byte occupying another 16-byte unit. Because of the 17-byte dimension, utilization is poor because the second 16-byte unit in each is largely padded with zeros.

In FIG. 10B, a padding and reshaping operation performed by data processor circuit 318 are illustrated, according to an embodiment. As a convolution operation often reduces the size of output data, padding is often used to allow the output data to be generated with a particular size and shape. Data processor circuit 318 first performs padding of zeros at the periphery of source data 1010 to generate a padded source data 1020. The padded source data 1020 is then reshaped to two NP2 work units 1030. The padding and NP2 shaping operation shown in FIG. 10B again improve the utilization of neural engine 314.

Example Process for NP2 Reshaping

Figure 11:
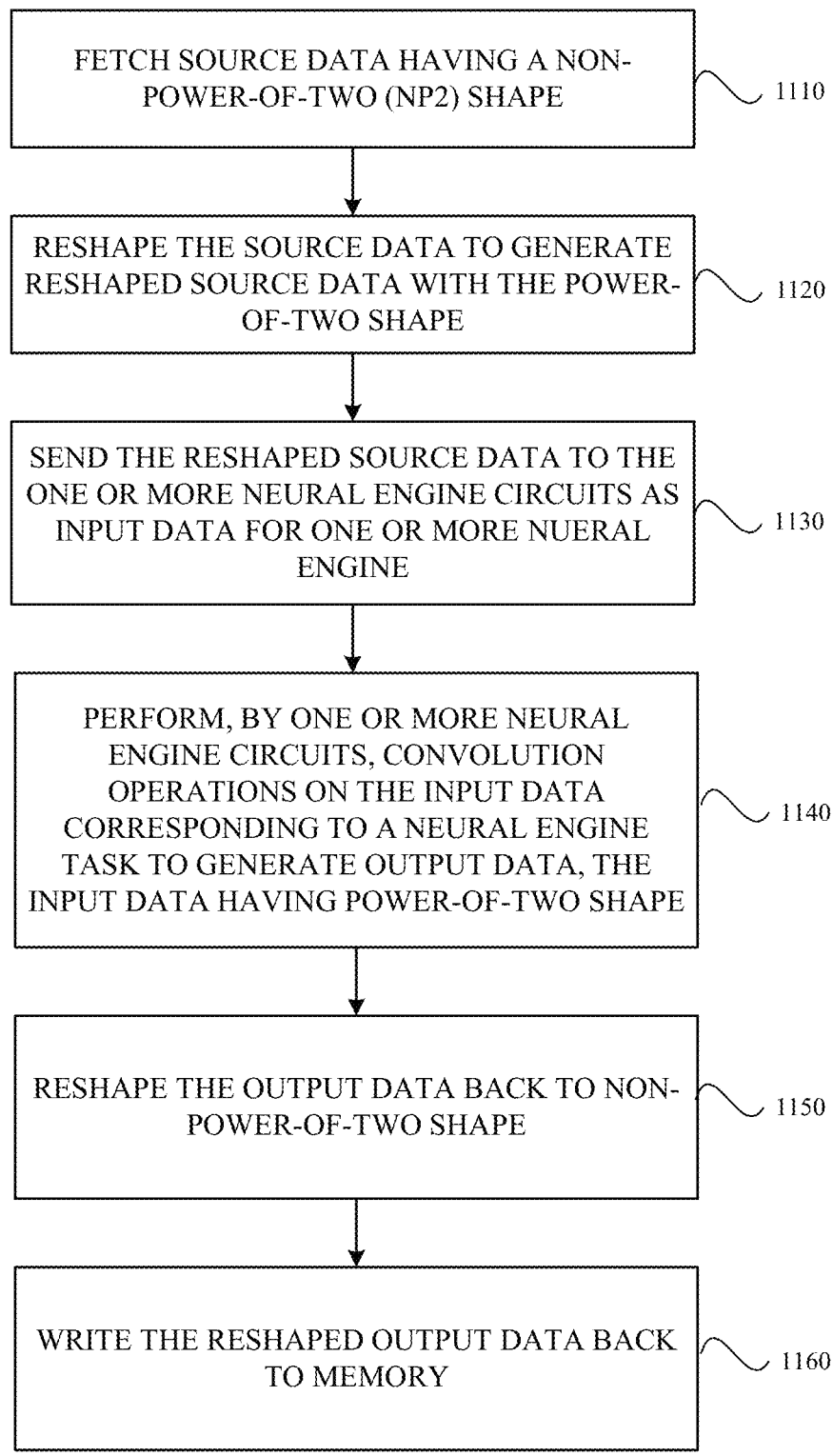
FIG. 11 is a flowchart illustrating an example process for performing neural processing operations with NP2 work units, according to one embodiment.

FIG. 11 is a flowchart depicting an example process for performing an NP2 reshaping operation in a neural processor circuit 218, according to an embodiment. The process may be cooperatively performed by various components of neural processor circuit 218. An NP2 reshaping may occur, for example, when neural processor circuit 218 fetches data corresponding to a machine learning model. A rasterize divides the data into multiple smaller units such as tiles and work units. The shapes of the tiles may be NP2 and the resulting source data to be sent as work units may also be NP2.

Neural processor circuit 218 fetches 1110, by data processor circuit 318, source data having an NP2 shape. The source data may be fetched from buffer 334 or system memory 230 and may corresponding to a machine learning model. For example, the source data may be an image to be processed by the machine learning model or an intermediate output corresponding to an inner layer of the machine learning model. A rasterizer may send a command to fetch the source data in an NP2 shape to improve the utilization of neural processor circuit 218 or to better match other data such as the shape of one or more kernels to be convolved with the source data. For example, the rasterizer may detect that the source data is in the shape of 17×17. Based on the size of source data, the rasterizer may send a command to data processor circuit 318 to fetch source data with an NP2 shape.

Data processor circuit 318 reshapes 1120 the source data to generate reshaped source data with the p2 shape. The reshaping of the source data may include realigning the plurality of rows of the source data to a single row in the reshaped source data. Examples of realignment are shown in FIGS. 9B, 9D, and 10B. In some cases, based on a setting of a neural network, data processor circuit 318 pads the source data with the NP2 shape with zeros prior to reshaping the source data. The setting may be transmitted by a rasterizer. Padding is added to a source data so that the output data after convolution may achieve a certain shape and size. For example, the data processor circuit 318 may use shifters to shift the source data downward for one or more rows to pad the top row(s) of the source data with zeros. Data within a row may also be shifted in one or more positions to pad zeros at the beginning. Additional zeros may also be padded at the end of the row and in the last one or more rows.

Data processor circuit 318 sends 1130 the reshaped source data to neural engine circuits 314 as the input data of a neural engine 314. The neural engine 314 receives the reshaped source data that is in a P2 shape. The reshaped source data may first be stored in FIFO unit to 810. The reshaped source data is in turn fetched to the array of flip-flops 820 in a P2 shape to be ready as the input data of neural engine computation core 416. For various cycles, Multiplexers 830 may select various input data in different orders to generate input data of different shapes.

The neural processor circuit 218 performs 1140, by one or more neural engine circuits 314, convolution operations on input data corresponding to a neural engine task to generate output data. convolution operations may correspond to operations in one or more convolutional layers in a CNN. The convolution operations may also correspond to operations in other types of machine learning models. The neural engines 314 processes the input data having a P2 shape. For example, each neural engine 314 has certain hardware elements, such as an array of flip-flops 820, which are arranged in a P2 configuration and number. As such, neural engine 314 operates work units in the P2 shape.

Neural engine 314 generates output data, which may be returned to data processor circuit 318. Data processor circuit 318 receives the output data, which may also be in a P2 shape, from the neural engine 314. Data processor circuit 318 reshapes 1150 the output data back to an NP2 shape. The NP2 shape of the output data may be the same or different from the NP2 shape of the source data. Data processor circuit 318 writes the reshaped output data that is in the NP2 shape back to memory, such as buffer 334 or system memory 230.

While the process shown in FIG. 11 is discussed with using NP2 source data and hardware that supports P2 work units, in various embodiments data processor circuit 318 may also reshape source data from one shape to another that is not from an NP2 to a P2 shape. For example, in some embodiments, hardware in a neural engine 314 may support a specific P2 shape and the source data may be reshaped from one P2 shape to another P2 shape. In other embodiments, hardware in a neural engine 314 may support an NP2 shape and the source data may be reshaped from a P2 shape to the NP2 shape. Other various configurations and combinations may also be possible.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:
   one or more neural engine circuits configured to perform convolution operations on input data corresponding to a neural engine task to generate output data, the one or more neural engine circuits configured to process the input data having a power-of-two (P2) shape; and
   a data processor circuit configured to:
      fetch source data having a non-power-of-two (NP2) shape, wherein the source data comprises a first plurality of rows each having a first bit width;
      reshape the source data to generate reshaped source data with the P2 shape such that the reshaped source data comprises a second plurality of rows that is less than the first plurality of rows, wherein each of the second plurality of rows has a second bit width that is greater than the first bit width; and
      send the reshaped source data to the one or more neural engine circuits as the input data.

2. The neural processor circuit of claim 1, wherein the data processor circuit is further configured to:
   pad the source data with the NP2 shape prior to reshaping the source data based on a setting of a neural network.

3. The neural processor circuit of claim 1, wherein the data processor circuit is further configured to:
   receive the output data from the one or more neural engine circuits; and
   reshape the output data to the NP2 shape.

4. The neural processor circuit of claim 3, wherein the output data is in the P2 shape.

5. The neural processor circuit of claim 1, wherein at least one of the neural engine circuits comprises:
   a first-in-first-out (FIFO) buffer configured to receive the reshaped source data; and
   an array of flip-flops having a P2 number of flip-flops for storing the reshaped source data as the input data.

6. The neural processor circuit of claim 5, wherein the at least one of the neural engine circuits further comprises:
   a plurality of multiplexers configured to fetch different input data in different orders to generate a plurality of work units that are in different P2 shapes.

7. The neural processor circuit of claim 1, wherein the data processor circuit comprises a masking circuit configured to remove at least a subset of the reshaped source data prior to transmitting the reshaped source data to the one or more neural engine circuits.

8. A method of performing neural processing operations, the method comprising:
   fetching, by a data processor circuit, source data having a non-power-of-two (NP2) shape, wherein the source data comprises a first plurality of rows each having a first bit width;
   reshaping, by the data processor circuit, the source data to generate reshaped source data with a power-of-two (P2) shape such that the reshaped source data comprises a second plurality of rows that is less than the first plurality of rows, wherein each of the second plurality of rows has a second bit width that is greater than the first bit width;

sending, by the data processor circuit, the reshaped source data to one or more neural engine circuits as input data; and performing, by the one or more neural engine circuits, convolution operations on the input data corresponding to a neural engine task to generate output data, the input data having the P2 shape.

9. The method of claim 8, further comprising:
padding, by the data processor circuit, the source data with the NP2 shape prior to reshaping the source data based on a setting of a neural network.

10. The method of claim 8, further comprising:
receiving the output data from the one or more neural engine circuits; and
reshaping the output data to the NP2 shape.

11. The method of claim 10, wherein the output data is in the P2 shape.

12. The method of claim 8, further comprising:
receiving the reshaped source data by a first-in-first-out (FIFO) buffer at one of the neural engine circuits; and
storing the reshaped source data as the input data by an array of flip-flops having a P2 number of flip-flops.

13. The method of claim 12, further comprising:
fetching, by a plurality of multiplexers, different input data in different orders to generate a plurality of work units that are in different P2 shapes.

14. The method of claim 8, further comprising:
removing at least a subset of the reshaped source data prior to transmitting the reshaped source data to the one or more neural engine circuits.

15. A system, comprising:
a system memory storing a machine learning model; and
a neural processor, comprising:
one or more neural engine circuits configured to perform convolution operations on input data corresponding to a neural engine task to generate output data, the one or more neural engine circuits configured to process the input data having a power-of-2 (P2) shape; and a data processor circuit configured to:
fetch source data having a non-power-of-2 (NP2) shape, wherein the source data comprises a first plurality of rows each having a first bit width, the source data corresponding to data in the machine learning model;
reshape the source data to generate reshaped source data with the P2 shape such that the reshaped source data comprises a second plurality of rows that is less than the first plurality of rows, wherein each of the second plurality of rows has a second bit width that is greater than the first bit width; and
send the reshaped source data to the one or more neural engine circuits as the input data.

16. The system of claim 15, wherein the data processor circuit is further configured to:
pad the source data with the NP2 shape prior to reshaping the source data based on a setting of a neural network.

17. The system of claim 15, wherein the data processor circuit is further configured to:
receive the output data from the one or more neural engine circuits; and
reshape the output data to the NP2 shape.

18. The system of claim 17, wherein at least one of the neural engine circuits comprises:
a first-in-first-out (FIFO) buffer configured to receive the reshaped source data; and
an array of flip-flops having a P2 number of flip-flops for storing the reshaped source data as the input data.

19. The system of claim 18, wherein the at least one of the neural engine circuits further comprises:
a plurality of multiplexers configured to fetch different input data in different orders to generate a plurality of work units that are in different P2 shapes.

20. The system of claim 15, wherein the data processor circuit comprises a masking circuit configured to remove at least a subset of the reshaped source data prior to transmitting the reshaped source data to the one or more neural engine circuits.

* * * * *

UNITED STATES PATENT AND TRADEMARK OFFICE
CERTIFICATE OF CORRECTION

PATENT NO. : 12,327,177 B2
APPLICATION NO. : 17/148358
DATED : June 10, 2025
INVENTOR(S) : Mills Page 1 of 1

It is certified that error appears in the above-identified patent and that said Letters Patent is hereby corrected as shown below:

In the Claims

In Column 26, Claim 18, Line 25, delete "claim 17," and insert -- claim 15, --, therefor.

Signed and Sealed this
Twelfth Day of August, 2025

Coke Morgan Stewart
*Acting Director of the United States Patent and Trademark Office*